(12) United States Patent
Rubenstein (10) Patent No.: US 6,859,894 B1
(45) Date of Patent: Feb. 22, 2005

(54) SYSTEM AND METHOD FOR RISK MANAGEMENT OF ERRORS IN SOFTWARE PROGRAM CODE

(75) Inventor: Tzvi V. Rubenstein, Sharon, MA (US)

(73) Assignee: EMC Corporation, Hopkinton, MA (US)

( * ) Notice: Subject to any disclaimer, the term of this patent is extended or adjusted under 35 U.S.C. 154(b) by 596 days.

(21) Appl. No.: 09/997,926

(22) Filed: Nov. 30, 2001

(51) Int. Cl.$^7$ .............................................. G06F 11/00
(52) U.S. Cl. ........................... 714/38; 714/37; 717/124
(58) Field of Search ............................ 714/26, 37, 38; 717/126, 124

(56) References Cited

U.S. PATENT DOCUMENTS

| | | | | |
|---|---|---|---|---|
| 6,308,288 B1 | * | 10/2001 | Chang et al. | 714/38 |
| 6,594,820 B1 | * | 7/2003 | Ungar | 717/124 |
| 6,668,340 B1 | * | 12/2003 | Baker et al. | 714/38 |
| 6,671,873 B2 | * | 12/2003 | Milobinski et al. | 717/124 |
| 6,697,965 B1 | * | 2/2004 | Shimada | 714/38 |
| 6,748,584 B1 | * | 6/2004 | Witchel et al. | 717/136 |

* cited by examiner

Primary Examiner—Nadeem Iqbal
Assistant Examiner—Timothy M. Bonura
(74) Attorney, Agent, or Firm—Robert Kevin Perkins; Leanne J. Fitzgerald; John M. Gunther (57) ABSTRACT

This invention is a system and method for managing the risk that errors in interpreting program code may lead to costly problems. A code difference criterion related to code value and position is used to lower such risk. Satisfying the criterion ensures that one or more other program codes interpreted in a subsequent instance will be sufficiently different enough from a first program code to be interpreted in a first instance that such problems may be avoided. One aspect of satisfying the difference criterion is requiring that every code have a minimum 2 bits difference from any other code.

20 Claims, 5 Drawing Sheets

SYSTEM AND METHOD FOR RISK MANAGEMENT OF ERRORS IN SOFTWARE PROGRAM CODE

A portion of the disclosure of this patent document contains command formats and other computer language listings, all of which are subject to copyright protection. The copyright owner, EMC Corporation, has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to management of software program code creation, and more particularly to a system and method for managing the risk that code created may later be interpreted erroneously.

BACKGROUND OF THE INVENTION

Computer systems employ microprocessors that interpret software or program code instructions extremely fast. Rapid decisions and results follow in split-second chain reaction fashion. Sometimes the program code being interpreted may be read incorrectly, due to electronic noise for example, and in such a case an error may be flagged which slows down the computers operation. On the other hand the code may be interpreted to mean something other than that which it really means and an erroneous action results, which in turn may lead to other such erroneous actions. In any case such misinterpreted code will typically lead to expensive delays and costs associated with service calls and possibly repairs.

Sometimes service calls are called due to erroneously flagged errors. At the time of service, it may not be apparent that the service call is due to an error. The error message may then dictate that a component such as an electronics board or hard disk drive be replaced. In such a case the removed component may be later tested to determine its cause of failure. But the testing would probably reveal no trouble found. In this case the component would be destroyed or scrapped as its quality reputation has been severely damaged even when it in fact is fine. In this case, there would have been costly delays to normal production because of the flagged errors, a costly service call, an expensive repair and removal of a component that was probably never flawed in the first place. Moreover, the original problem(s) probably are still present in the system and are ready to repeat.

The expensive problems described above may be even more costly in a modern system used for data storage and retrieval. As is known in the art, such computer systems generally include a central processing unit (CPU), a memory subsystem, and a data storage subsystem. According to a network or enterprise model of the computer system, the data storage system associated with or in addition to a local computer system, may include a large number of independent storage devices or disks housed in a single enclosure or cabinet. This array of storage devices is typically connected to several computers over a network or via dedicated cabling. Such a model allows for the centralization of data that is to be shared among many users and also allows for a single point of maintenance for the storage functions associated with the many host processors.

The data storage system stores critical information for an enterprise that must be available for use substantially all of the time. If an error occurs on such a data storage system it must be fixed as soon as possible because such information is at the heart of the commercial operations of many major businesses. A recent economic survey from the University of Minnesota and known as Bush-Kugel study indicates a pattern that after just a few days (2 to 6) without access to their critical data many businesses are devastated. The survey showed that 25% of such businesses were immediately bankrupt after such a critical interruption and less than 7% remained in the marketplace after 5 years.

As has been described above, it is important to focus error recovery procedures on systems that actually require it and extremely wasteful to focus such efforts on systems not actually in need of repair. The same that is true for simple computer systems is true for data storage systems but magnified in importance and scale of potential costs.

Accordingly there is a need in the general computer arts and the more specific data storage and retrieval arts to manage error handling so that false errors are less likely to occur and so that program code is more likely to be interpreted as it is written instead of as another code message that may be similar.

SUMMARY OF THE INVENTION

The present invention is a system and method for managing a risk that interpretation of program code may be faulty. The method includes the steps of establishing a criterion denoted as a code difference criterion, and applying the code difference criterion to arrive at a set of predetermined size of members that are acceptable codes that satisfy the difference criterion.

This invention allows management of the risk that errors in interpreting program code may lead to costly problems. A code difference criterion related to code value and position is used to lower such risk. Satisfying the criterion ensures that each of the possible program codes will be sufficiently different from all other possible program codes such that non-catastrophic system problem will not render them identical.

One embodiment of this invention includes a method for managing software program code for risk related to errors associated with interpretation of such program code by determining acceptable program codes to reduce such errors. This method involves establishing a criterion denoted as a code difference criterion for determining one or more acceptable program codes. A candidate program code and a set of other candidate program codes having a predetermined number of member candidate program codes are selected. Under program control the system determines whether the candidate program code is an acceptable program code based on a comparison of the candidate program code to each member of the set of other candidate program codes in accordance with whether the code difference criterion is satisfied.

In general a difference criterion of a predetermined number of bits difference of code must be satisfied. For example, if the predetermined number is 2 then satisfying the difference criterion requires that every code will have at least 2 bits different from any other code.

In an alternative embodiment, the invention includes a system for carrying out method steps. In another alterative embodiment, the invention includes a program product for carrying out method steps.

BRIEF DESCRIPTION OF THE DRAWINGS

The above and further advantages of the present invention may be better under stood by referring to the following description taken into conjunction with the accompanying drawings in which.

DETAILED DESCRIPTION OF THE PREFERRED EMBODIMENT

The methods and apparatus of the present invention are intended for use in general purpose digital computers that become specific purpose digital computers under the construct of the inventive logic of this invention. The methods enabled by such logic may be useful with data storage systems, such as the Symmetrix Integrated Cache Disk Array system available from EMC Corporation of Hopkinton, Mass.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission. And may be implemented such that herein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

The logic for carrying out the method is embodied as part of the system described below beginning with reference to FIG. 1. One aspect of the invention is embodied as a method that is described below with detailed specificity in reference to FIGS. 3–6.

Figure 1:
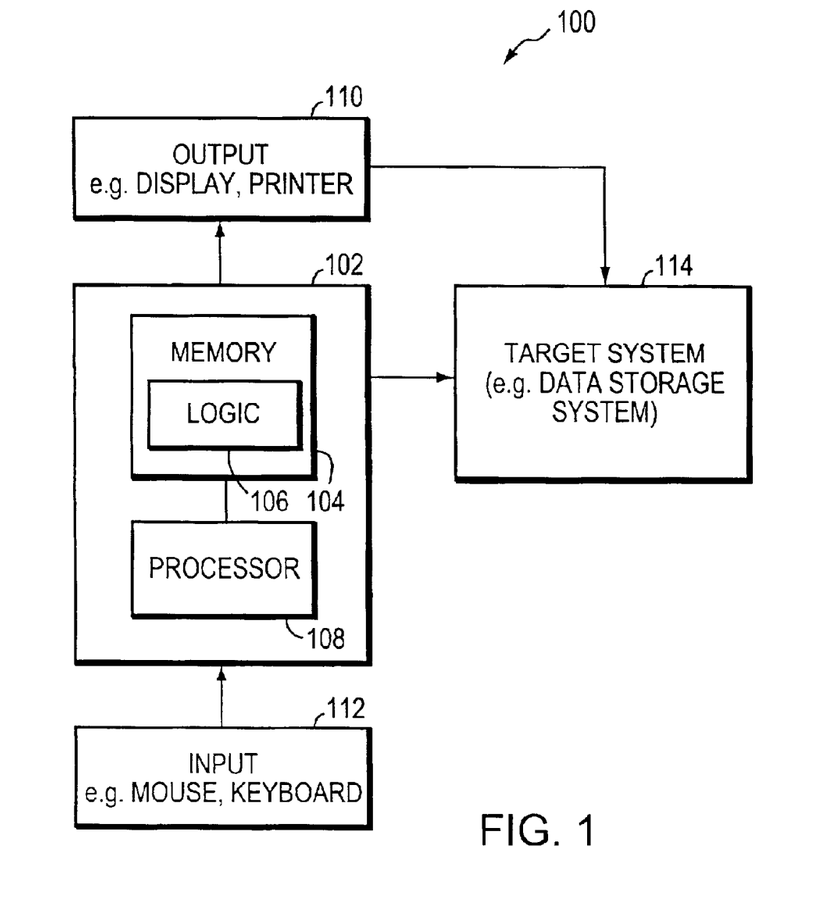
FIG. 1 is a block diagram of the preferred architecture of the invention and including a schematic of the logic of this invention.

FIG. 1 shows an overall system 100 employing the Logic 106 that carries out the method steps of the invention. A computer system 102, which may be a general-purpose digital computer transformed into a special purpose computer by implementation of Logic 106 residing in memory element 104, which may be conventional electronic memory, e.g. RAM. A processor 108, such as a well-known Intel microprocessor carries instructions in a conventional manner and allows the Logic 106 to operate in the computer system, perhaps under control of an operating system (not shown).

Figure 2:
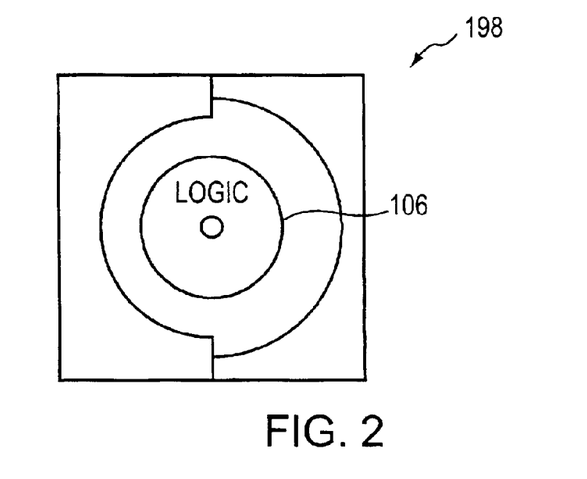
FIG. 2 is an exemplary representation of a computer-readable medium encoded with the logic of FIG. 1 for enabling the method of the present invention.

Reference is made now to FIGS. 1 and 2. Logic 106 is preferably implemented as software, and may be in the well known C or C++ programming language. Of course, the Logic could be implemented in hardware as well. Computer System 102 may be in communication with an input device 112 (e.g. a mouse or keyboard) or output device 110 (e.g. a display or printer). The results of running Logic 106 may be useful on a target system, e.g. a Data Storage System, such as the EMC Symmetrix Integrated Cache Disk Array available from EMC of Hopkinton, Mass. Logic 106 may be implemented on a computer-readable medium, e.g. a CD ROM or Floppy Disk as shown in FIG. 2.

Figure 3:
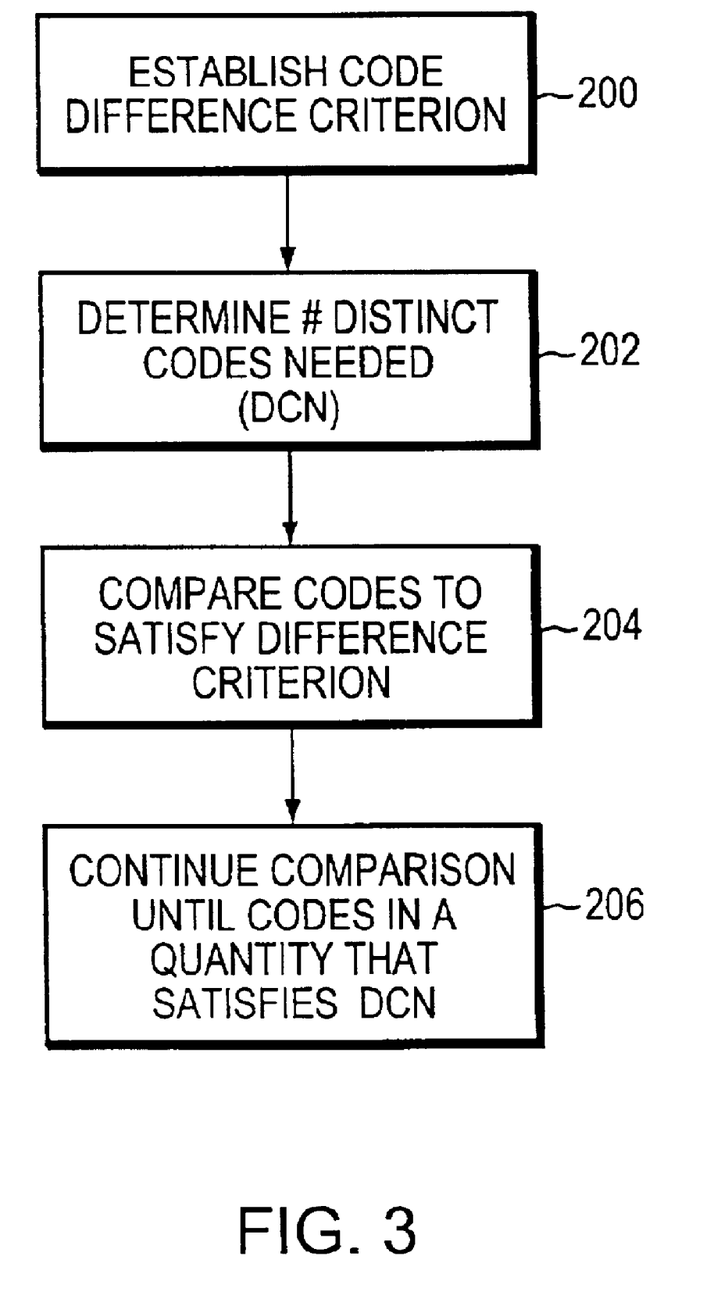
FIG. 3 is an overview of the method steps of this invention.

FIG. 3 shows an overview of the method steps carried out by Logic 106 in system 100 (FIG. 1). The method of this invention employs a method using a criterion that must be satisfied before a code may be used. The criterion is denoted as a Difference Criterion. Employing the Difference Criterion generally reduces the risk of causing the types of problems described below (example shown in Table 1). The Difference Criterion is preferably structured so that in order to satisfy it every code must have at least 2 bits that are different from any other code that may also be used.

Step 200 allows a user to establish a code Difference Criterion. In general a difference criterion of a predetermined number of bits difference of code must be satisfied. For example, if the predetermined number is 2 then satisfying the difference criterion requires that every code will have at least 2 bits different from any other code. In such a case, the Difference Criterion may be short handedly referred to as requiring a "minimum 2 bits difference."

Referring again to FIG. 3, a user would then need to determine the number (#) of distinct codes needed (DCN), i.e. the number of codes that must have different values. The choice for DCN typically depends on a plethora of circumstances leading to a design choice. For example, a system may need 100 different error messages, and 400 other different types of messages, in which case the value of DCN would be 500. The values of each candidate code would then have to be compared to determine if the Difference Criterion was satisfied (Step 204). This would be continued until enough codes were found that satisfied DCN.

Without employing the present invention, prior art schemes act as follows. The number of bits (lines) x, needed for the generation and transmission of codes is based on the solution of the equation:

$$2^x = N \qquad \text{(Equation 1),}$$

where N is the number of distinct codes required.

The number of distinct codes needed is typically a predetermined design choice based on how many situations needed to be handled. For example a distinct code might be needed for each error message, for each instruction to be handled, and so forth.

For example, if N was determined to be 6, then Equation 1 will yield a value of x of 3. The 6 codes may be selected from the possible 8 shown below in Table 1:

| Decimal Value | Binary Code Value |
| --- | --- |
| 0 | 000 |
| 1 | 001 |
| 2 | 010 |
| 3 | 011 |
| 4 | 100 |
| 5 | 101 |
| 6 | 110 |
| 7 | 111 |

As can be seen from this example, some of the 6 codes chosen will only be one distinct bit different from some of the other codes. But the inventor has critically recognized that this can lead to a disadvantage that is solved by this invention. The disadvantage is that any type of intermittent electronic noise operating on the signal line carrying the code can change its binary value, by for example changing a 1 to a 0 or vise-versa.

Illustrating further this example, if the decimal value of 2, which has the binary value of 010 is changed by a noise glitch to 011 or 110 then it will be erroneously interpreted as either decimal 3 or decimal 6, respectively. Such an interpretation might lead to flagging an error when the underlying condition that would lead to such an error is not present, or otherwise flagging an error incorrectly. This would lead to the types of costly problems described above.

The method of this invention employs a method using a criterion that must be satisfied before a code may be used. The criterion is denoted as a Difference Criterion. Employing the Difference Criterion generally reduces the risk of causing the types of problems described above with reference to the example of Table 1. The Difference Criterion is preferably structured so that in order to satisfy it every code must have at least 2 bits that are different from any other code that may also be used.

The Logic 106 of this invention employs the Difference Criterion to any candidate line of code to determine its suitability in a relatively automated fashion. Employing such a Difference Criterion for a requirement of 7 distinct codes would yield the following dispositions as shown in Table 2.

TABLE 2

Example of a requirement for 7 distinct codes using Difference Criterion

| Decimal Value | Binary Code Value | Disposition |
| --- | --- | --- |
| 1 | 00001 | TRUE |
| 2 | 00010 | TRUE |
| 3 | 00011 | FALSE |
| 4 | 00100 | TRUE |
| 5 | 00101 | FALSE |
| 6 | 00110 | FALSE |
| 7 | 00111 | TRUE |
| 11 | 01011 | TRUE |
| 16 | 10000 | TRUE |
| 22 | 10110 | TRUE |

TRUE means that the Difference Criterion is correctly satisfied.
FALSE means that the Difference Criterion is not correctly satisfied.

So in the example of Table 2, the following decimal values are acceptable: 1, 2, 4, 7, 11, 16, and 22, wherein the values of 3, 5, and 6 are rejected as being non-acceptable because they do not satisfy the Difference Criterion. Each of the acceptable codes satisfies the minimum 2-bits difference required (for the exemplary case).

In general, one embodiment for carrying out the method of FIG. 3 includes a steps for managing software program code for risk related to errors associated with interpretation of such program code by determining acceptable program codes to reduce such errors. This method involves establishing a criterion denoted as a code difference criterion for determining one or more acceptable program codes. A candidate program code and a set of other candidate program codes having a predetermined number of member candidate program codes are selected. Under program control the system determines whether the candidate program code is an acceptable program code based on a comparison of the candidate program code to each member of the set of other candidate program codes in accordance with whether the code difference criterion is satisfied. Such an embodiment is described in detail with reference to FIGS. 4–6.

Figure 4:
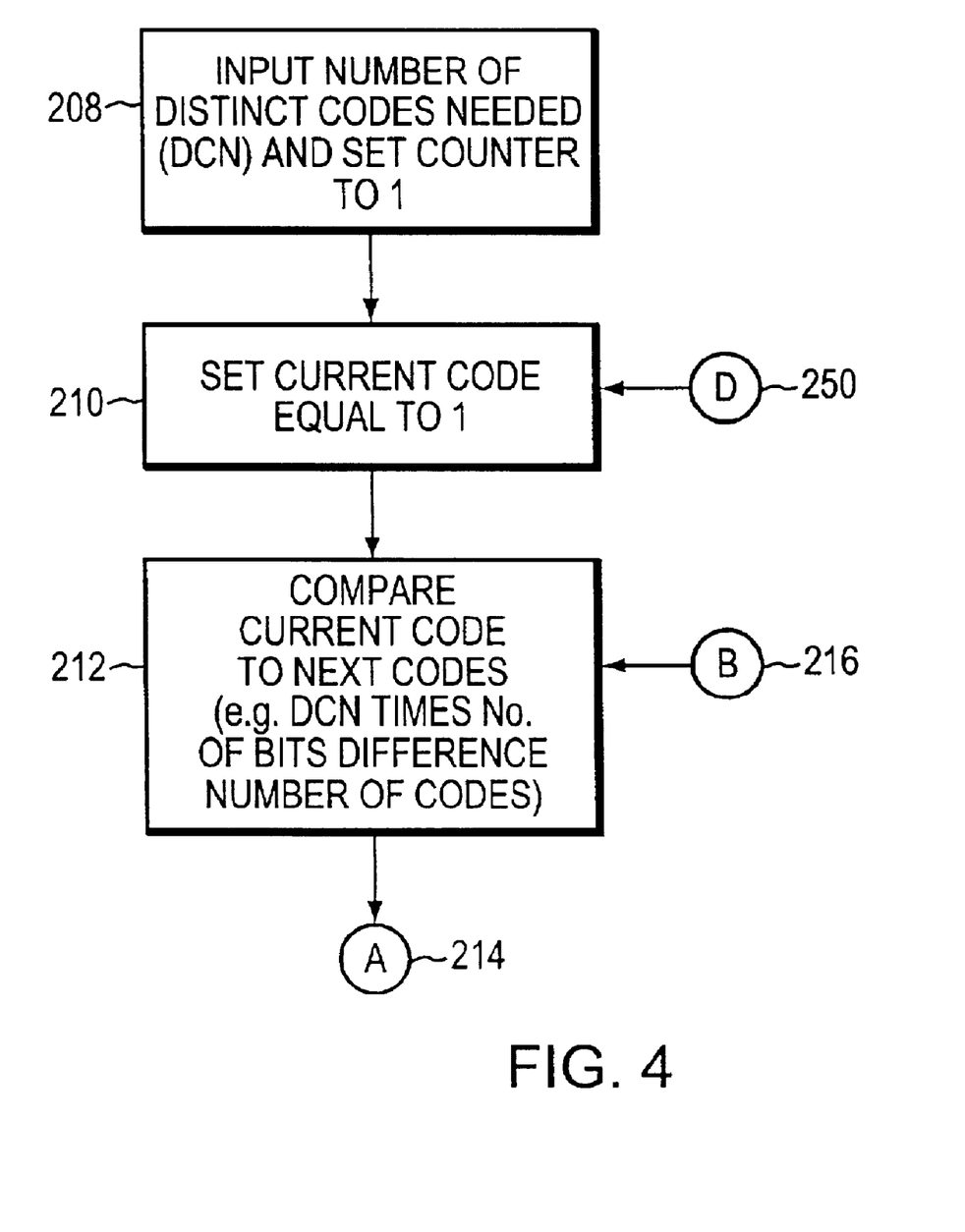
FIG. 4 is a flow logic diagram illustrating some of the method steps of FIG. 3 that are carried out by the logic of this invention of FIG. 1.
Figure 6:
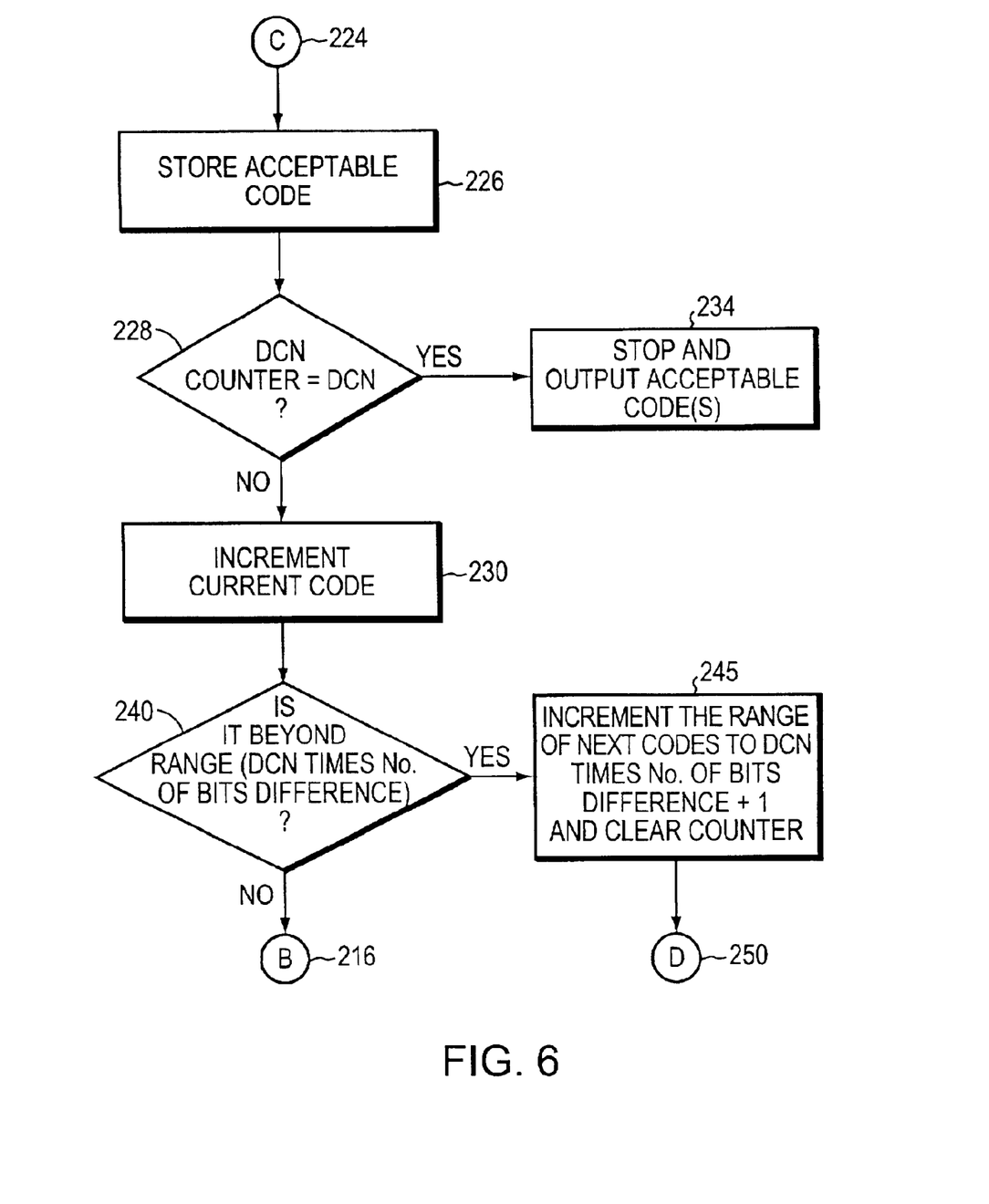
FIG. 6 is another flow logic diagram illustration other method steps also carried out by the logic of FIG. 1.

This detailed description of the method steps now follows with reference to flow-logic diagrams in FIGS. 4 and 6. Using these diagrams, one skilled in the art may create a suitable computer program for carrying out computer-executed steps. Such a program may be written in any computer-executable language, but C or C++ is a good choice.

Referring to FIG. 4, Step 208 allows a user to use input device 112 to input a value for DCN, and the Logic then sets the DCN counter to 1. Next a Current Code value is set equal to decimal value 1 (binary 00001). Although the illustrations for the preferred embodiment are in binary, one skilled in the art will recognize the invention to be applicable to any numerically based system, such as a hexadecimal or another numerical system. In step 212, the Current Code is then compared to the Next Candidate Codes (Next Codes), which can be arrived at in a number of ways. A good choice is to take the DCN times the number of different bits sought to arrive at some group of Next Codes that is likely to produce a sufficient set of acceptable Codes (equal to at least the DCN value).

In the event that DCN times the number of different bits sought does not yield a large enough set, one skilled in the art will recognize that the set can be made larger by choosing a larger multiplier, such as the number of different bits sought+1. Step 214 is a connecting step "A" that flows into the logic diagrams shown in FIG. 5.

Figure 5:
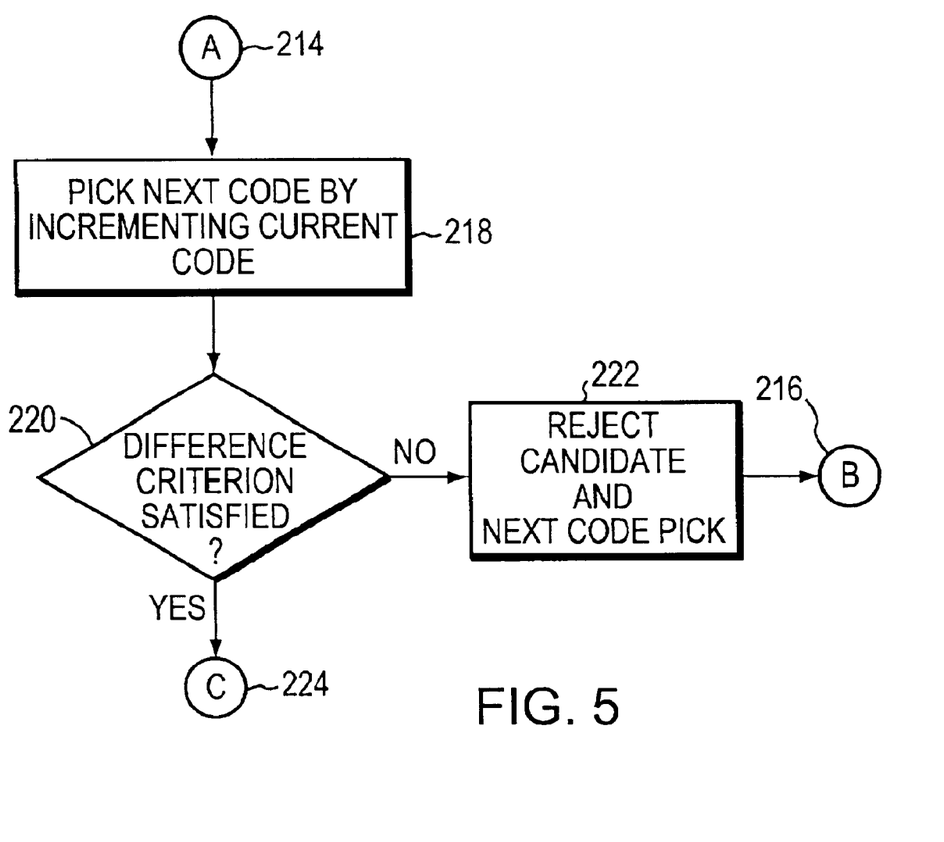
FIG. 5 is another flow logic diagram illustrating other method steps also carried out by the logic of FIG. 1.

Referring to FIG. 5, step 218 increments the Current Code by 1. A determination is made in step 220 to see if the Difference Criterion is satisfied for the Current Code (as compared to each of the Next Codes produced by creating a set of the size DCN times the number of different bits sought, wherein each member of the set is a code having a decimal value from 1 to DCN times the number of different bits sought. Naturally there will be an overlap in identity with the Current Code itself but it is understood that this case can be excluded from consideration when determining if the Current Code satisfies the Difference Criterion. Returning to the method steps, if the Difference Criterion is not satisfied for every comparison with each Next Code (other than one that is identical) then the answer is "No." In this case the candidate is rejected in step 222. Processing flows again to logic step 216 (connecting step B), which in turn returns processing back to the diagram illustrated in FIG. 4, and flows into step 212. If on the other hand, the Difference Criterion is satisfied then processing flows to step 224 and connecting step C (flows to FIG. 6).

Only those codes satisfying the Difference criterion are stored for use, shown in step 226 of FIG. 6. In step 228 the value of the DCN counter, depicting the number of acceptable codes found, is compared to the desired DCN. If the amounts are equal then processing stops in step 234 and the acceptable codes are outputted to display or printed or otherwise passed, such as to Target System 114. If the amounts are not equal then the Current Code is incremented by 1 in step 230 and a new search loop is initiated at step 212. If the entire block of Next Codes was used as Current Code and the DCN was not satisfied, the definition of the Next Codes block counter is incremented by 1 in step 245. All counters are cleared and the entire process returns to the diagram illustrated in FIG. 4 and in turn step 210.

Processing continues so that each code is compared to each other code so the value of each one is at least 2 bits in difference from each other and the DCN counter is equal to the value of the DCN. When this occurs then processing stops in step 234 and the acceptable codes are outputted to display or printed or otherwise passed, such as to Target System 114.

Another way of stating the requirement of the preferred implementation of the Difference Criterion is that it requires that the acceptable program code have a binary equivalent that when compared to a binary equivalent of each member of the set of other candidate program codes has a minimum 2-bits difference from each member. (See for example Table 2).

In general, a plurality of acceptable program codes are determined based on a plurality of comparisons of a plurality of candidate program codes to a plurality of sets of other candidate program codes. Each candidate program code of the plurality of candidate program codes is selected from a universal group consisting of the first candidate program code and the first set of other candidate program codes. Also each member of each set of other candidate program codes of the plurality of other candidate program codes is also selected from this universal group.

One skilled in the art will realize that there are many ways to accomplish the type of repetitive yet iterative looping, comparing, and adjusting that must be performed to carry out the method steps. Although not limited to such an embodiment, the inventor has recognized that a use of array indexed loops, sometimes referred to as "For next i," and "For next j," loops used in a language such a C or C++ are satisfactory. For comparing the values of each bit itself it may be useful to employ shift registers. One may also choose to not subject any Code found satisfying the Difference Criterion, but then one must store this value and account for it in subsequent comparisons. Depending on available resources and lines of code one is willing to write, one may choose to allow each subsequent comparison to have some repetition and include such a Code in subsequent comparisons. Nevertheless, this aspect is a design choice, and one skilled in the art will recognize that this invention is not limited to any such implementation.

A system and method has been described for managing the risk of errors due to faulty interpretation of program code. Having described a preferred embodiment of the present invention, it may occur to skilled artisans to incorporate these concepts into other embodiments. Nevertheless, this invention should not be limited to the disclosed embodiment, but rather only by the spirit and scope of the following claims and their equivalents.

What is claimed is:

1. A method for managing software program code for risk related to errors associated with interpretation of such program code by determining acceptable program codes to reduce such errors, the method comprising the steps of:
    establishing a criterion denoted as a code difference criterion for determining one or more acceptable program codes;
    selecting a first candidate program code;
    selecting a first set of other candidate program codes have a predetermined number of member candidate program codes and wherein the predetermined number of member candidate program codes is a predetermined multiple of a number of distinct codes required; and
    determining whether the first candidate program code is an acceptable program code based on a comparison of the first candidate program code to each member of the first set of other candidate program codes in accordance with whether the code difference criterion is satisfied.

2. The method of claim 1, wherein the code difference criterion includes a requirement that the acceptable program code have a binary equivalent that when compared to each respective binary equivalent of each member of the first set of other candidate program codes has a minimum predetermined number of bits difference from each member.

3. The method of claim 2, wherein a plurality of acceptable program codes are determined based on a plurality of comparisons of a plurality of candidate program codes to a plurality of sets of other candidate program codes, wherein each candidate program code of the plurality of candidate program codes is selected from a universal group consisting of the first candidate program code and the first set of other candidate program codes and each member of each set of other candidate program codes of the plurality of other candidate program codes is also selected from the universal group.

4. The method of claim 3, wherein the plurality of acceptable program codes each satisfy the code difference criterion by having a minimum 2-bits difference from each other acceptable program code.

5. The method of claim 4, wherein the number of acceptable program codes is less than the predetermined number of member candidate program codes.

6. The method of claim 5, wherein the predetermined number of member candidate program codes is a multiple of a number of distinct codes required.

7. The method of claim 6, where the multiple is 2.

8. The method of claim 1, wherein the predetermined number of bits is 2.

9. The method of claim 1, wherein the predetermined multiple of a number of distinct codes is 2.

10. The method of claim 1, wherein the program code is used with a data storage system.

11. A program product for managing software program code for risk related to errors associated with interpretation of such program code by determining acceptable program codes to reduce such errors, the program product being comprised of:
    computer-executable logic contained on a computer-readable medium and which is configured for causing the following computer-executed steps to occur;
    establishing a criterion denoted as a code difference criterion for determining one or more acceptable program codes;
    selecting a first candidate program code;
    selecting a first set of other candidate program codes have a predetermined number of member candidate program codes and wherein the predetermined number of member candidate program codes is a predetermined multiple of a number of distinct codes required; and
    determining whether the first candidate program code is an acceptable program code based on a comparison of the first candidate program code to each member of the first set of other candidate program codes in accordance with whether the code difference criterion is satisfied.

12. The program product of claim 1, wherein the software program code is used with a data storage system.

13. A method for managing software program code for risk related to errors associated with interpretation of such program code by determining acceptable program codes to reduce such errors, the method comprising the steps of:
    establishing a criterion denoted as a code difference criterion for determining one or more acceptable program codes;
    selecting a first candidate program code;
    selecting a first set of other candidate program codes have a predetermined number of member candidate program codes; and
    determining whether the first candidate program code is an acceptable program code based on a comparison of the first candidate program code to each member of the first set of other candidate program codes in accordance with whether the code difference criterion is satisfied, wherein the code difference criterion includes a requirement that the acceptable program code have a binary equivalent that when compared to each respective binary equivalent of each member of the first set of other candidate program codes has a minimum predetermined number of bits difference from each member and wherein a plurality of acceptable program codes are determined based on a plurality of comparisons of a plurality of candidate program codes to a plurality of sets of other candidate program codes, wherein each candidate program code of the plurality of candidate program codes is selected from a universal group consisting of the first candidate program code and the first set of other candidate program codes and each member of each set of other candidate program codes of the plurality of other candidate program codes is also selected from the universal group.

14. The method of claim 13, wherein the plurality of acceptable program codes each satisfy the code difference criterion by having a minimum 2-bits difference from each other acceptable program code.

15. The method of claim 14, wherein the number of acceptable program codes is less than the predetermined number of member candidate program codes.

16. The method of claim 15, wherein the predetermined number of member candidate program codes is a multiple of a number of distinct codes required.

17. The method of claim 16, where the multiple is 2.

18. A method for managing software program code for risk related to errors associated with interpretation of such program code by determining acceptable program codes to reduce such errors, the method comprising the steps of:

establishing a criterion denoted as a code difference criterion for determining one or more acceptable program codes;

selecting a first candidate program code;

selecting a first set of other candidate program codes have a predetermined number of member candidate program codes; and determining whether the first candidate program code is an acceptable program code based on a comparison of the first candidate program code to each member of the first set of other candidate program codes in accordance with whether the code difference criterion is satisfied, wherein the code difference criterion includes a requirement that the acceptable program code have a binary equivalent that when compared to each respective binary equivalent of each member of the first set of other candidate program codes has a minimum predetermined number of bits difference from each member and wherein the predetermined number of member candidate program codes is a predetermined multiple of a number of distinct codes required.

19. The method of claim 18, wherein the predetermined number of bits is 2.

20. The method of claim 18, wherein the predetermined multiple of a number of distinct codes is 2.

* * * * *